(12) United States Patent
Chen et al.

(10) Patent No.: US 8,115,204 B2
(45) Date of Patent: Feb. 14, 2012

(54) PHOTO ELEMENTS AND IMAGE DISPLAYS

(75) Inventors: Po-Yang Chen, Tainan (TW); Po-Sheng Shih, Hsinchu (TW); Tsu-Chiang Chang, Taipei (TW)

(73) Assignee: Hannstar Display Corp., New Taipei (TW)

( * ) Notice: Subject to any disclaimer, the term of this patent is extended or adjusted under 35 U.S.C. 154(b) by 848 days.

(21) Appl. No.: 12/193,938

(22) Filed: Aug. 19, 2008

(65) Prior Publication Data

US 2009/0051645 A1 Feb. 26, 2009

(30) Foreign Application Priority Data

Aug. 20, 2007 (TW) .............................. 96130694 A

(51) Int. Cl.
*H01L 29/04* (2006.01)
*G09G 3/36* (2006.01)

(52) U.S. Cl. .............. 257/59; 345/104; 257/E27.121; 257/E33.053

(58) Field of Classification Search ............... 257/59, 257/E27.121, E33.053; 345/104
See application file for complete search history.

(56) References Cited

U.S. PATENT DOCUMENTS

2008/0143942 A1* 6/2008 Chen et al. .................. 349/116
2009/0261660 A1* 10/2009 Flaherty ....................... 307/117

* cited by examiner

*Primary Examiner* — David S Blum
(74) *Attorney, Agent, or Firm* — Thomas|Kayden

(57) ABSTRACT

An exemplary embodiment of a photo element comprises a first line, a second line, a switch transistor, and a photo transistor. The switch transistor has a first electrode, a second electrode, and a first gate. One of the first electrode and the second electrode is electrically coupled to the first line, and the first gate is electrically coupled to the second line. The photo transistor is electrically coupled to the switch transistor and arranged to detect light. The photo transistor has a third electrode, a fourth electrode, and a second gate. At least one of the switch transistor and the photo transistor is an asymmetric transistor.

33 Claims, 14 Drawing Sheets

US 8,115,204 B2

PHOTO ELEMENTS AND IMAGE DISPLAYS

CROSS REFERENCE TO RELATED APPLICATIONS

This application claims the benefit of Taiwan application Serial No. 96130694 filed Aug. 20, 2007, the subject matter of which is incorporated herein by reference.

BACKGROUND OF THE INVENTION

1. Field of the Invention

The invention relates to a photo element, and more particularly to a photo element applied in an input display.

2. Description of the Related Art

In input displays, such as input liquid crystal displays, pixels generally comprise photo elements to serve as readout pixels with readout function, so that liquid crystal display panels can provide input and readout functions. The panels are referred to as in-cell input panels. Generally, photo elements are divided into two types: charge-mode photo elements and current-mode photo elements. FIG. 1 shows a circuitry of a conventional charge-mode photo element 100. The photo element 100 comprises a readout line Readout, a switch line SW, a bias line 30, a switch thin film transistor (TFT) 10, a photo TFT 20, and a capacitor C1. The photo TFT 20 is used to receive environment light. When a scan signal on the switch line SW turns on the switch TFT 10, the readout line Readout transmits charges to charge the capacitor C1 through the switch TFT 10. The brightness of the received environment light determines the conductivity of the photo TFT 20. When the scan signal on the switch line SW turns off the switch TFT 10 and the brightness of the received environment light is higher, the photo TFT 20 discharges the capacitor C1 more quickly. When the scan signal on the switch line SW turns off the switch TFT 10 and the brightness of the received environment light is lower, the photo TFT 20 discharges the capacitor C1 more slowly. As described above, light sensitivity of the photo TFT 20 seriously affects performance of the photo element 100. If the photo element 100 has high light sensitivity, the photo element 100 can operate in any light-receiving condition. Thus, it is important to enhance the light sensitivity of the photo TFT 20.

FIG. 2 shows a circuitry of a conventional current-mode photo element 200. The photo element 200 comprises a switch TFT STFT2, a photo TFT PTFT2, a readout line Readout2 (a first line), a switch line SW2 (a second line), and a bias line Bias1 (a third line). A first electrode (for example, drain D) and a gate G of the photo TFT PTFT2 are electrically coupled to the bias line Bias1, and a second electrode (for example, source S) thereof is electrically coupled to the switch TFT STFT2. A first electrode (for example, drain D), a second electrode (for example, source S), and a gate G of the switch TFT STFT2 are electrically coupled to the source S of the photo TFT PTFT2, the readout line Readout2, and the switch line SW2, respectively. When the switch line SW2 is at a high potential, the switch TFT STFT2 is turned on, and the photo TFT PTFT2 is turned on according to brightness of the received environment light to generate a corresponding light current. The corresponding light current can be provided to a signal detector (not shown in FIG. 2) through the switch TFT STFT2 and the readout line Readout2 for detecting a degree of the received environment light.

Moreover, FIG. 3 shows a circuitry of an improved photo element 300 of U.S. patent application Ser. No. 11/611,320. The photo element 300 comprises a switch TFT STFT1, a photo TFT PTFT1, a readout line Readout1 (a first line), and a switch line SW1 (a second line). A first electrode (for example, drain D), a second electrode (for example, source S), and a gate G of the switch TFT STFT1 are electrically coupled to a second electrode (for example, source S) of the photo TFT PTFT1, the readout line Readout1, and the switch line SW1, respectively. A first electrode (for example, drain D) and a gate G of the photo TFT PTFT1 are both electrically coupled to the switch line SW1. When the switch line SW1 is at a high potential, the switch TFT STFT1 and the photo TFT PTFT1 are turned on, and the photo TFT PTFT1 is turned on according to brightness of the received environment light to generate a corresponding light current. The corresponding light current can be provided to a signal detector (not shown in FIG. 3) through the switch TFT STFT1 and the readout line Readout1 for detecting degree of the received environment light. As the photo element 100 of FIG. 1, the light currents of the photo elements 200 and 300 of FIGS. 2 and 3 are affected by the brightness of the environment light received by the surfaces of the photo TFTs PTFT1 and PTFT2. Generally, the light current is directly proportional to the degree of the environment light received by the photo TFT. Thus, enhancing light sensitivity of the photo TFTs PTFT1 and PTFT2 is very important.

BRIEF SUMMARY OF THE INVENTION

An exemplary embodiment of a photo element comprises a first line, a second line, a switch transistor, and a photo transistor. The switch transistor has a first electrode, a second electrode, and a first gate. One of the first electrode and the second electrode is electrically coupled to the first line, and the first gate is electrically coupled to the second line. The photo transistor is electrically coupled to the switch transistor and arranged to detect light. The photo transistor has a third electrode, a fourth electrode, and a second gate. At least one of the switch transistor and the photo transistor is an asymmetric transistor.

Another exemplary embodiment of an input device comprises a readout line, a switch line, a photo transistor, and a signal detector. The photo transistor is arranged to detect light and has a first electrode, a second electrode, and a gate. The first electrode is electrically coupled to the readout line, the gate is electrically coupled to the switch line, and the photo transistor is an asymmetric transistor. The signal detector is electrically coupled to the readout line and arranged to detect a light current generated by the photo transistor.

An exemplary embodiment of an image display comprises a first substrate and a pixel disposed on the first substrate. The pixel comprises a pixel electrode, a first line, a second line, a pixel transistor, a switch transistor, and a photo transistor. The pixel transistor is electrically coupled to the pixel electrode. The switch transistor has a first electrode, a second electrode, and a first gate. One of the first electrode and the second electrode is electrically coupled to the first line, and the first gate is electrically coupled to the second line. The photo transistor is electrically coupled to the switch transistor and has a third electrode, a fourth electrode, and a second gate. At least one of the switch transistor and the photo transistor is an asymmetric transistor.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4:
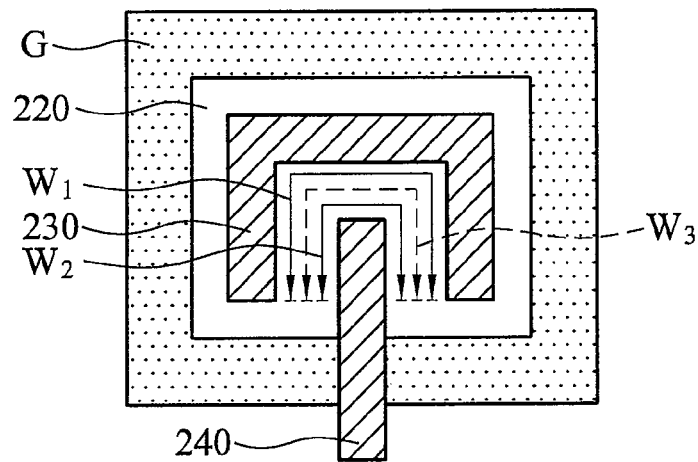
FIG. 4 shows exemplary embodiments of an asymmetric transistor.
Figure 5:
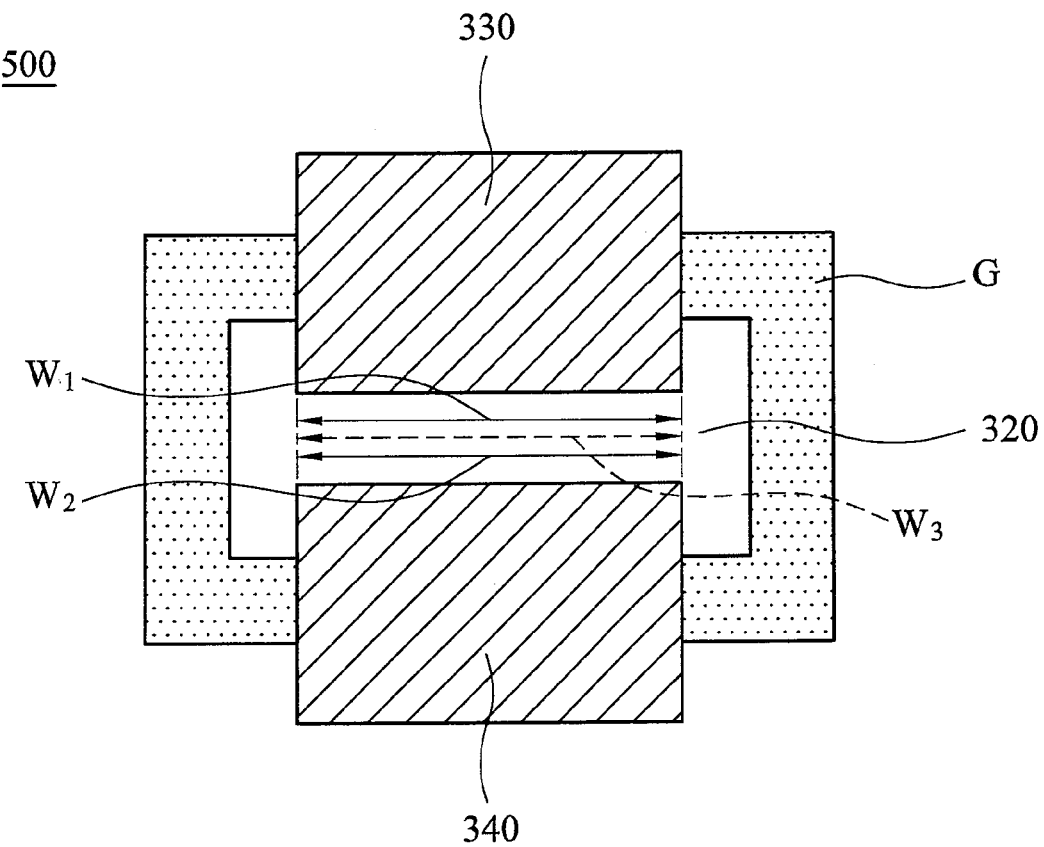
FIG. 5 shows exemplary embodiments of a symmetric transistor.

FIGS. 4 and 5 respectively show exemplary embodiments of an asymmetric transistor 400 and a symmetric transistor 500. The asymmetric transistor 400 comprises a gate G, an amorphous-silicon layer 220, a first electrode 230, and a second electrode 240. When the first electrode 230 is defined as a drain, the second electrode 240 is a source. On the contrary, when the first electrode 230 is defined as a source, the second electrode 240 is a drain. In following embodiments, the potential of the first electrode is compared with the potential of the second electrode, and the electrode with the higher potential serves as a drain while the electrode with the lower potential serves as a source. In FIG. 4, $W_1$ represents the length of the first electrode 230, and $W_2$ represents the length of the second electrode 240, wherein $W_1 > W_2$. $W_3$ represents the channel length of the asymmetric transistor 400. $W_3$ is generally equal to the average value of the length $W_1$ of the first electrode 230 and the length $W_2$ of the second electrode 240. In FIG. 5, the symmetric transistor 500 comprises a gate G, an amorphous-silicon layer 320, a first electrode 330, and a second electrode 340. When the potential of the first electrode 330 is higher than that of the second electrode 340, the first electrode 330 is defined as a drain, and the second electrode 340 is defined as a source. On the contrary, when the potential of the second electrode 340 is higher than that of the first electrode 330, the second electrode 340 is defined as a drain, and the first electrode 330 is defined as a source. In FIG. 5, $W_1$ represents the length of the first electrode 330, and $W_2$ represents the length of the second electrode 340, wherein $W_1 = W_2$. $W_3$ represents the channel length of the symmetric transistor 500 and is equal to $W_1$ and $W_2$.

For the same area, since the asymmetric transistor 400 has a longer channel length than the symmetric transistor 500, the asymmetric transistor 400 has larger conductivity ratio than the symmetric transistor 500. The larger conductivity ratio can decrease signal transmission delay. Thus, a switch transistor and/or a photo transistor within a photo element of the embodiments of the invention have the asymmetric structure as shown in FIG. 4. In the preferred embodiments, the switch transistor and photo transistor are implemented by thin film transistors or amorphous-silicon thin film transistors, but not limited to that.

TABLE 1

| drain ($V_d$) = gate ($V_g$) = 15 V, L = 5 um | First type | Second type |
|---|---|---|
| Structure | Wd < Ws | Wd > Ws |
| current $I_{d1}$ (dark, A) | 3.60E−06 | 2.20E−06 |
| current $I_{d2}$ (2150 cd/cm^2(bright), A) | 6.60E−06 | 5.28E−06 |
| current $I_{d2}$ − current $I_{d1}$ (current difference, A) | 3.01E−06 | 3.08E−06 |
| current $I_{d2}$/current $I_{d1}$ (current ratio) | 1.84E−00 | 2.40E−00 |

Moreover, the switch transistor in the photo element requires a large current to alleviate loading effect, and the photo transistor requires a large bright to dark current ratio to increase light sensitivity and signal/noise ratio. Table 1 shows measured results of an asymmetric transistor, wherein Wd represent the length of a drain of a thin film transistor, and Ws represent the length of a source thereof. The bias condition in this measurement is Vd=Vg=15V and Vs=0V, which the drain has higher potential than the source. According to Table 1, for the almost same current differences (the bright environment current $I_{d2}$ minus the dark environment current $I_{d1}$) of the first type and the second type, the current ratio for the second type is larger than that for the first type, thus, the photo transistor is appropriately implemented by the second type (Wd>Ws). Referring to FIG. 4, the first electrode 230 can serve as a drain of the photo transistor, while the second electrode 240 can serve as a source thereof, wherein the potential of the first electrode 230 is higher than that of the second electrode 240. Moreover, the switch transistor operates in a dark environment. According to Table 1, the current $I_{d1}$ in the first type is larger. Thus, the switch transistor is appropriately implemented by the first type (Wd<Ws). Referring to FIG. 4, the first electrode 230 can serve as a source of the switch transistor, while the second electrode 240 can serve as a drain thereof, wherein the potential of the second electrode 240 is higher than that of the first electrode 230.

Figure 3:
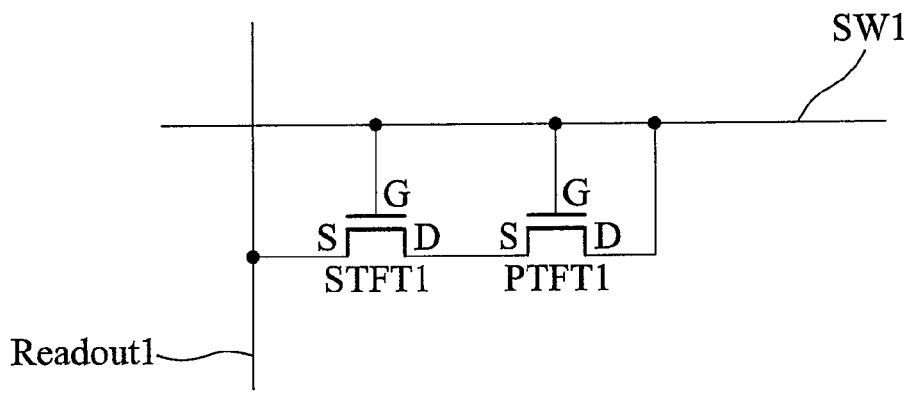
FIG. 3 shows a circuitry of an improved photo element.
Figure 6:
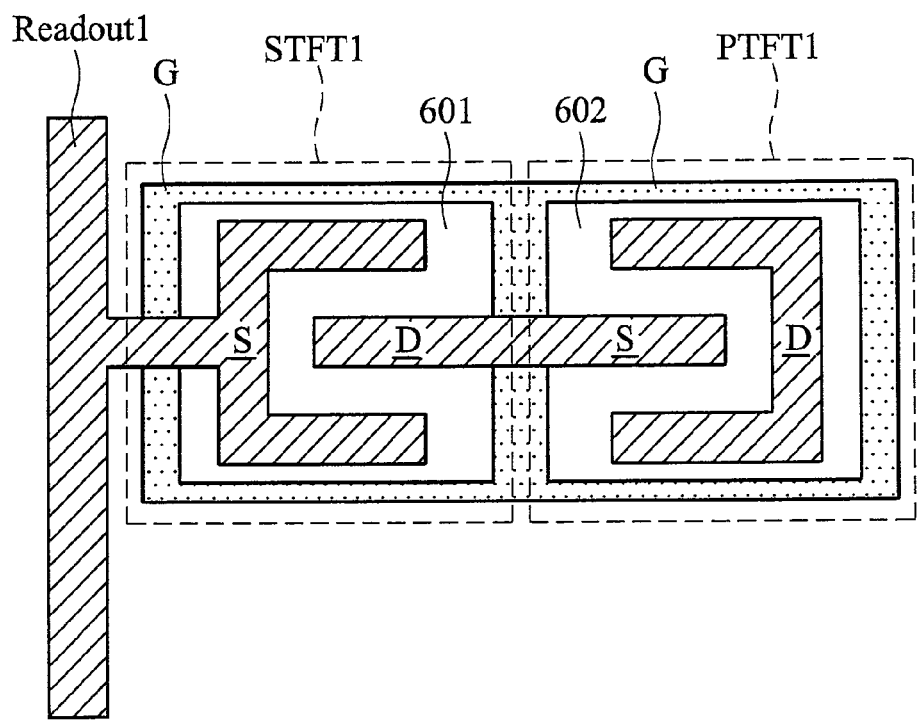
FIG. 6 shows an exemplary embodiment of a photo element.
Figure 7:
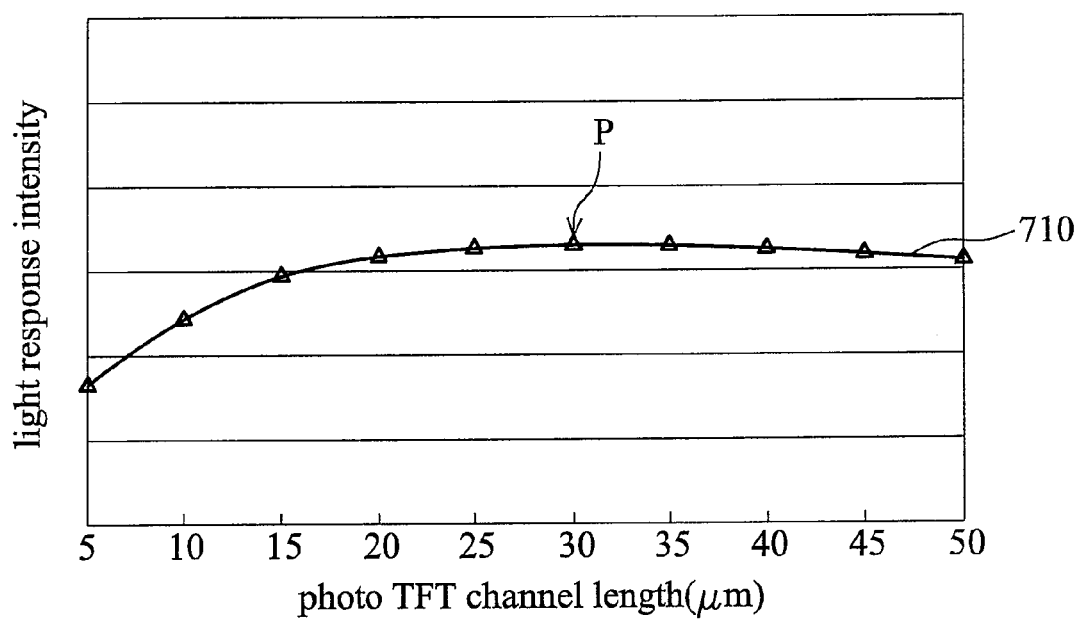
FIG. 7 is a relationship diagram showing light response intensity of a photo transistor in different channel lengths.

FIG. 6 shows an exemplary embodiment of a photo element according to the above transistor characteristics. The equivalent circuit of the photo element of FIG. 6 is shown in FIG. 3. In the embodiment, the switch transistor STFT1 and the photo transistor PTFT1 are implemented by asymmetric transistors, such as U-shape (also referring to C-shape or semicircle-shaped) transistors. The switch transistor STFT1 is the first type of transistor, that is the length of the source S is longer than the length of the drain D (Wd<Ws). In the structure of the switch transistor STFT1, the source S has an approximate U, C or semicircle shape, and the drain D has an approximate rectangle or bar shape. The photo transistor PTFT1 is the second type of transistor, that is the length of the source S is shorter than the length of the drain D (Wd>Ws). The potential of the drain of each of the transistors in the photo element is set as higher than that of the source. In the structure of the photo transistor PTFT1, the drain D has an approximate U, C or semicircle shape, and the source S has an approximate rectangle or bar shape. In other embodiments, the drain D and the source S can have any asymmetric shape and are not limited to the above shapes. The gate G of the switch transistor STFT1 and the gate G of the photo transistor PTFT1 are electrically coupled together. Labels 601 and 602 represent amorphous-silicon layers of the switch transistor and the photo transistor, respectively. Under the same area of thin film transistors, compared with the conventional symmetric transistors, the structure of FIG. 6 has preferred light response speed and performance. FIG. 7 is a relationship diagram showing light response intensity of a photo transistor of a photo element in different channel lengths. The channel length of a switch transistor (the average value of the drain length and the source length) is set as 30 um. The X axis of FIG. 7 represents the channel length of the photo transistor from 5 um to 50 um, while the Y axis of FIG. 7 represents the light response intensity of the photo transistor. The point P represents the light response intensity as the channel lengths of the switch transistor and the photo transistor are the same. According to the curve 710, when the channel length of the photo transistor is longer than the channel length of the switch transistor, the light response intensity is degraded due to the loading effect of the switch transistor. In order to provide the photo element with a preferred light sensitivity, the channel length of the photo transistor is designed to be less than or equal to the channel length of the switch transistor. When the channel length of the photo transistor was equal to the channel length of the switch transistor, the light response intensity reached a threshold value. Thus, in the embodiment of FIG. 6, the channel length of the photo transistor PTFT1 of the photo element is designed to be less than or equal to the channel length of the switch transistor STFT1.

Figure 1:
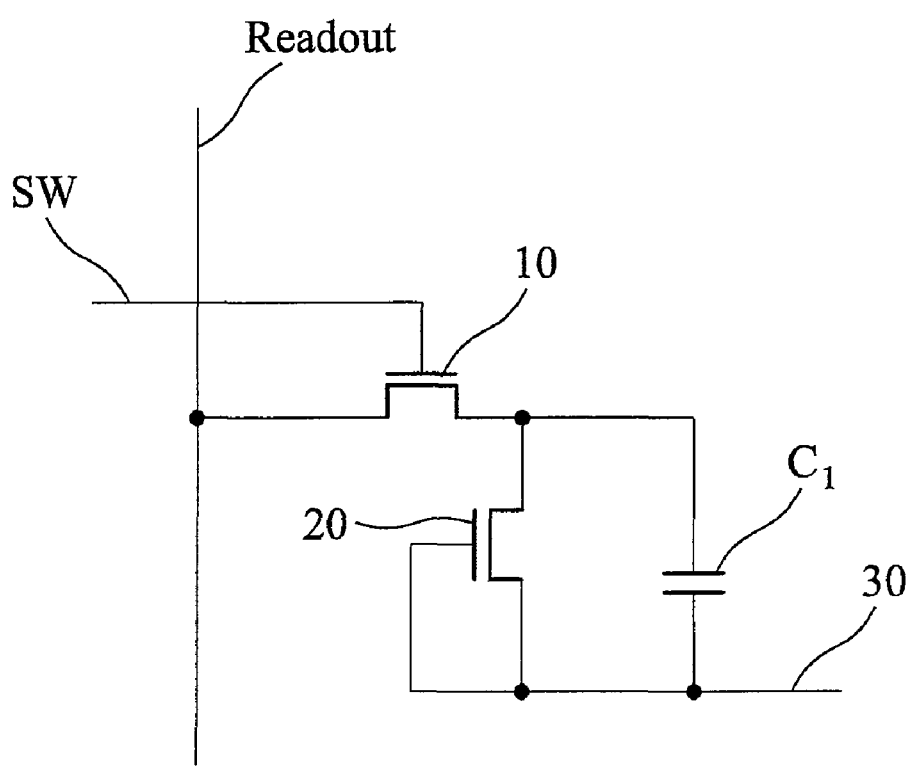
FIG. 1 shows a circuitry of a conventional charge-mode photo element.
Figure 2:
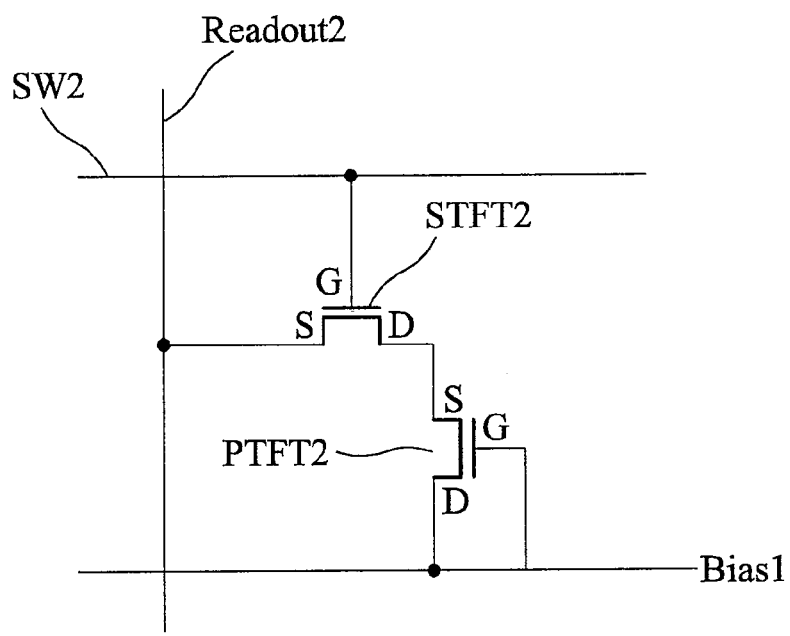
FIG. 2 shows a circuitry of a conventional current-mode photo element.
Figure 8:
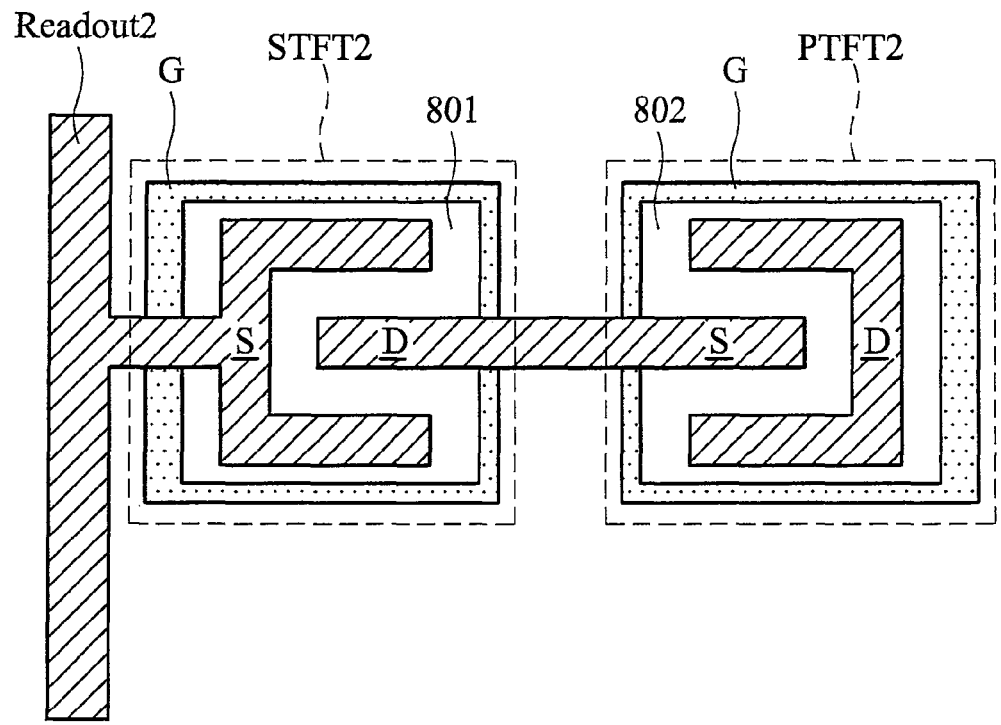
FIG. 8 shows another exemplary embodiment of a photo element.

FIG. 8 shows another exemplary embodiment of a photo element. The equivalent circuit of the photo element of FIG. 8 is shown in FIG. 2. In the embodiment, the switch transistor STFT2 and the photo transistor PTFT2 are implemented by asymmetric transistors, such as U-shape (also referring to C-shape or semicircle-shaped) transistors. The switch transistor STFT2 is the first type of transistor, that is the length of the source S is longer than the length of the drain D (Wd<Ws). The photo transistor PTFT2 is the second type of transistor, that is the length of the source S is shorter than the length of the drain D (Wd>Ws). The gate G of the switch transistor STFT2 and the gate G of the photo transistor PTFT2 are not electrically coupled together. Amorphous-silicon layers 801 and 802 are represented by blank areas in FIG. 8. Also, the potential of the drain of each of the transistors is set as higher than that of the source. In the embodiment of FIG. 8, the channel length of the photo transistor PTFT2 is designed to be equal to the channel length of the switch transistor STFT2, however, without limitation.

Figure 9:
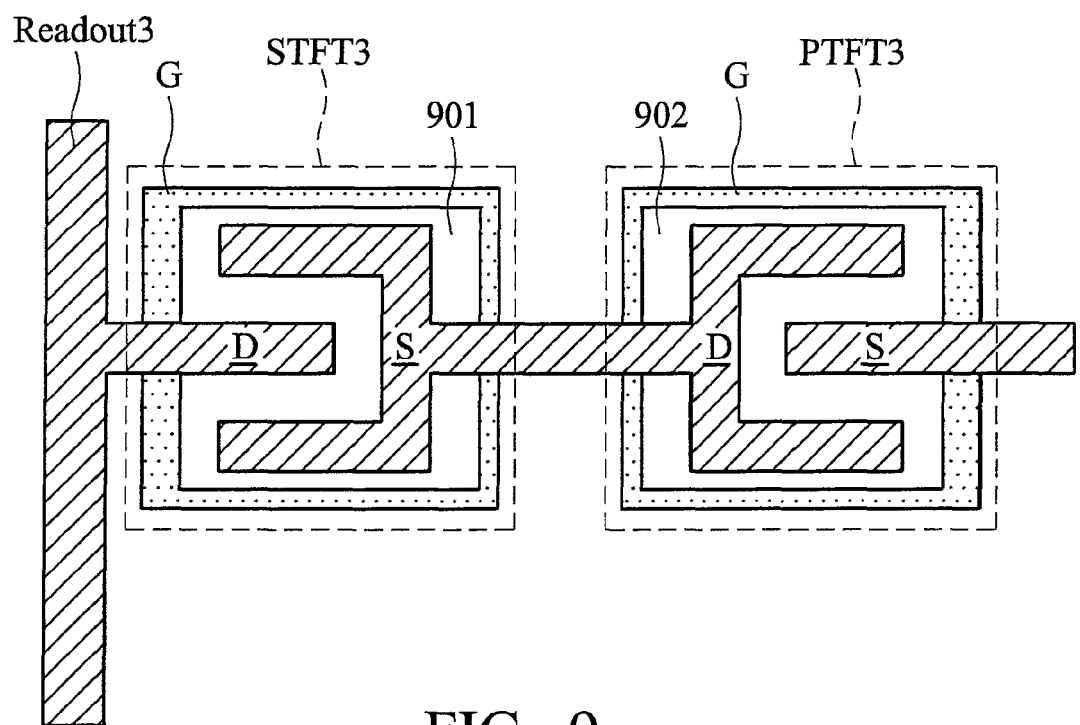
FIG. 9 shows another exemplary embodiment of a photo element.
Figure 10:
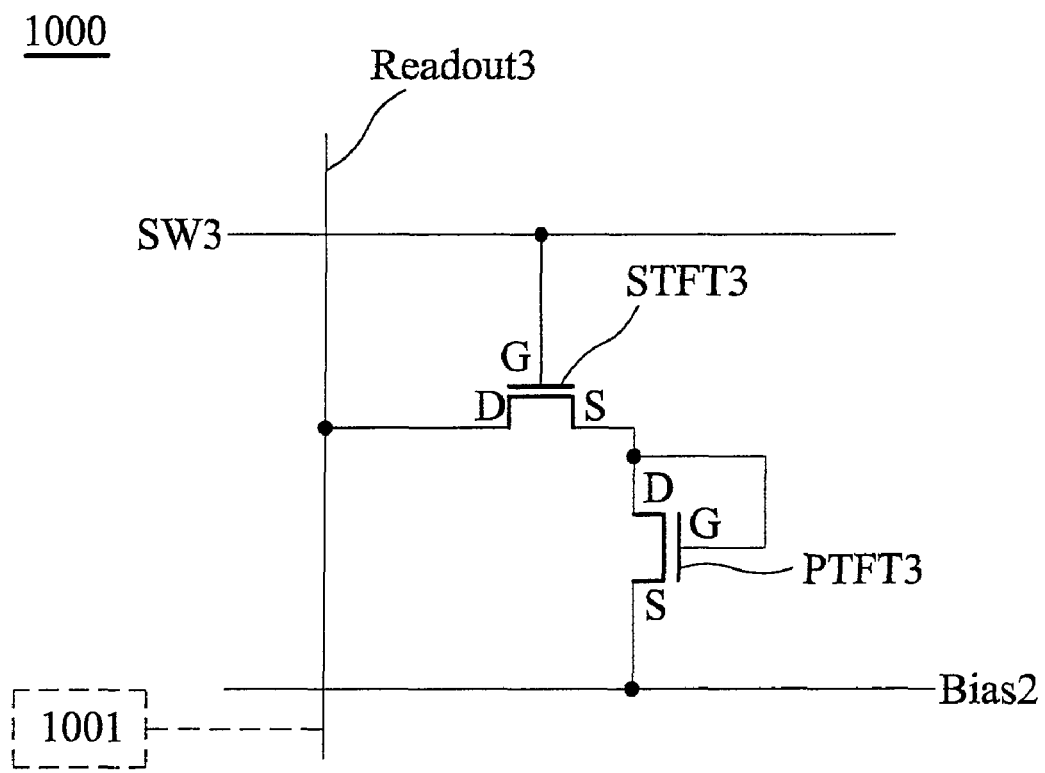
FIG. 10 shows an equivalent circuit of an exemplary embodiment of a photo element.

FIG. 9 shows another exemplary embodiment of a photo element. The equivalent circuit of the photo element of FIG. 9 is shown in FIG. 10. The equivalent circuit of FIG. 10 is similar to that in FIG. 2, except that a source S of a photo transistor PTFT3 is electrically coupled to a bias line (a third line) Biase2, and a drain D and a gate G thereof are electrically coupled to a source S of a switch transistor STFT3. The photo element 1000 of FIG. 10 can be applied in a system in which the potential of the readout line Readout3 (a first line) is higher than the potential of the bias line Biase2. The photo element of FIG. 2 can be applied in a system in which the potential of the bias line Biase1 is higher than potential of the readout line Readout2.

In the embodiment of FIG. 9, the switch TFT STFT3 and the photo TFT PTFT3 of the photo element are implemented by asymmetric transistors, such as U-shape (also referring to C-shape or semicircle-shaped) transistors, however, without limitation. Also, the potential of the drain of each of the transistors is set as higher than that of the source. As shown in FIG. 9, the switch transistor STFT3 is the first type of transistor, that is the length of the source S is longer than the length of the drain D (Wd<Ws). The photo transistor PTFT3 is the second type of transistor, that is the length of the source S is shorter than the length of the drain D (Wd>Ws). The gate G of the switch transistor STFT3 and the gate G of the photo transistor PTFT3 are not electrically coupled together. Amorphous-silicon layers 901 and 902 are represented by blank areas in FIG. 9.

In above embodiments, the readout lines Readout1, Readout2, and Readout3 can be electrically coupled to respective signal detectors for detecting and reading the light current generated by the photo transistors. For example, in FIG. 10, the readout line Readout3 is electrically coupled to a signal detector 1001, so that the light current generated by the photo transistor PTFT3 is transmitted to the signal detector 1001 through the switch transistor STFT3 and the readout line Readout3 for detecting and reading of degree of the received light.

Figure 11:
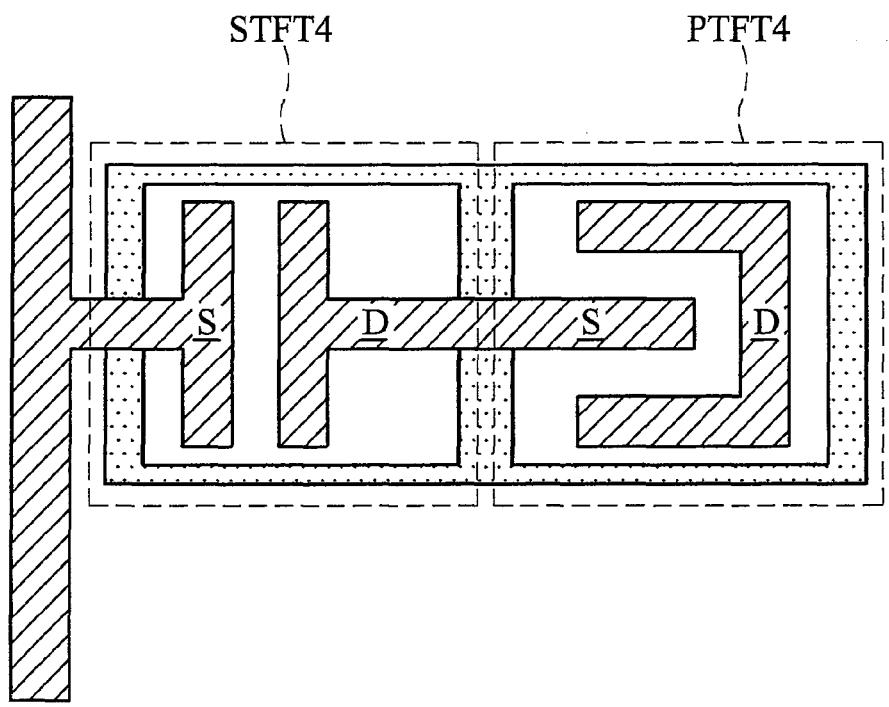
FIG. 11 shows another exemplary embodiment of a photo element.
Figure 12:
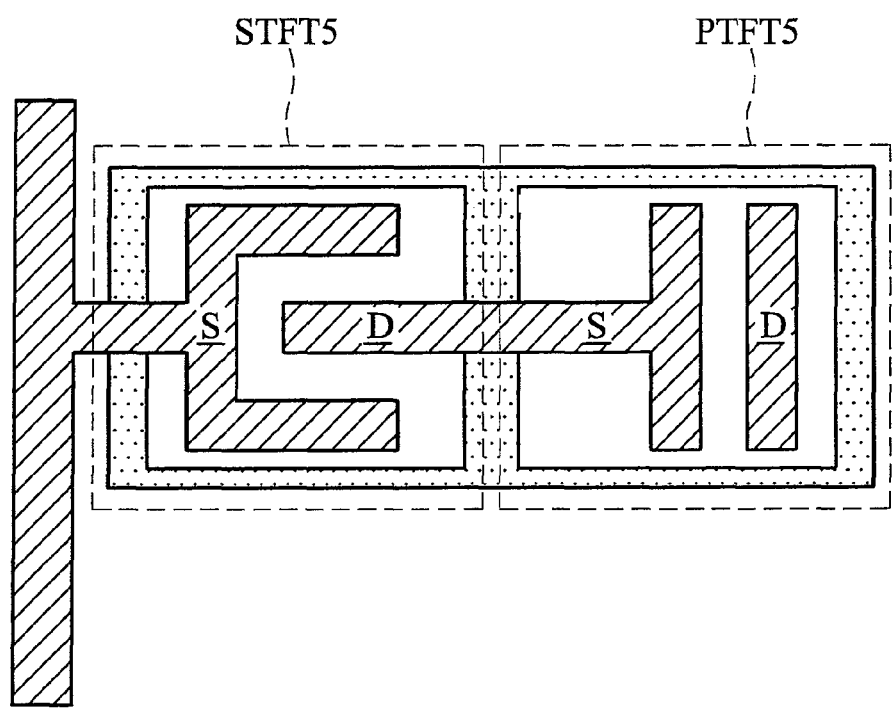
FIG. 12 shows another exemplary embodiment of a photo element.

Moreover, in the above embodiments, both the photo transistor and the switch transistor of each of the photo elements are asymmetric transistors. However, in some embodiments, only one of the photo transistor and the switch transistor of each of the photo elements is asymmetric transistors. FIG. 11 shows another exemplary embodiment of a photo element. The equivalent circuit of the photo element of FIG. 11 is shown in FIG. 3. A switch transistor STFT4 is a symmetric transistor, while a photo transistor PTFT4 is an asymmetric transistor, such as a U-shape transistor. Similarly, as the aforementioned, in another embodiment, the channel length of the photo transistor PTFT4 is preferably to be designed shorter than or equal to the channel length of the switch transistor STFT4. In contrast to the embodiment of FIG. 11, FIG. 12 shows another exemplary embodiment of a photo element. The equivalent circuit of the photo element of FIG. 12 is shown in FIG. 3. A switch transistor STFT5 is an asymmetric transistor, such as a U-shape transistor, while a photo transistor PTFT5 is a symmetric transistor. Also, in another embodiment, the channel length of the photo transistor PTFT5 is preferably to be designed shorter than or equal to the channel length of the switch transistor STFT5. Similarly, in the photo elements of FIGS. 2 and 10, only one of the photo transistor and the switch transistor of each of the photo elements is needed to be designed as an asymmetric transistor, and the detailed description is omitted herein.

The photo element 200, 300, or 1000 can be built in each or some of the general pixels (pixels without built-in photo elements) of an image displaying system (such as a liquid crystal display panel), so that the pixels with the photo element can be served as readout pixels with readout or input function. Thus, the liquid display panel can provide input and readout functions. The panel may be referred to as an in-cell input panel. The number of photo elements required for the in-cell input panel is determined according to the input function and the required resolution.

Figure 13:
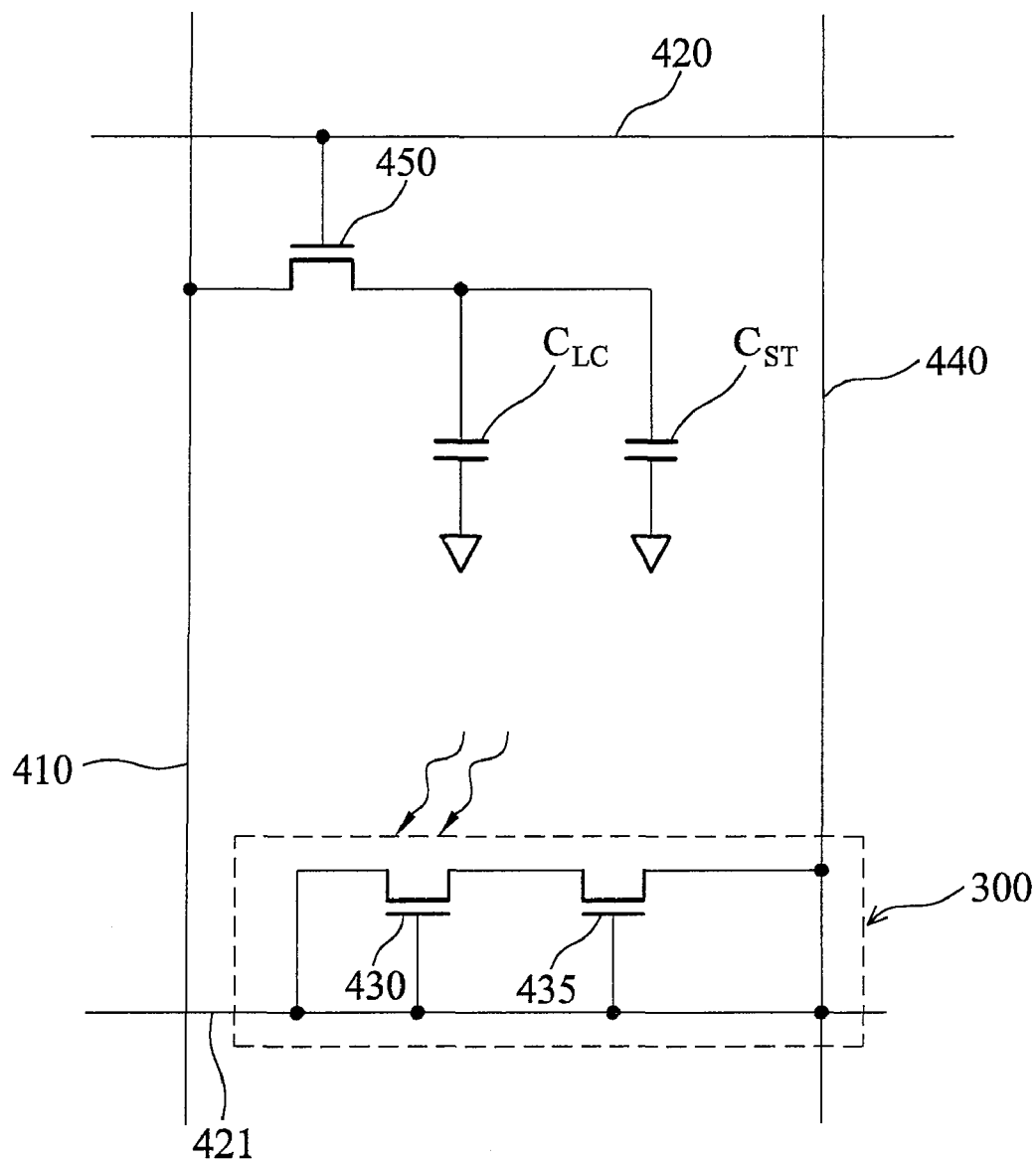
FIG. 13 shows an exemplary embodiment of a readout pixel circuit.
Figure 19:
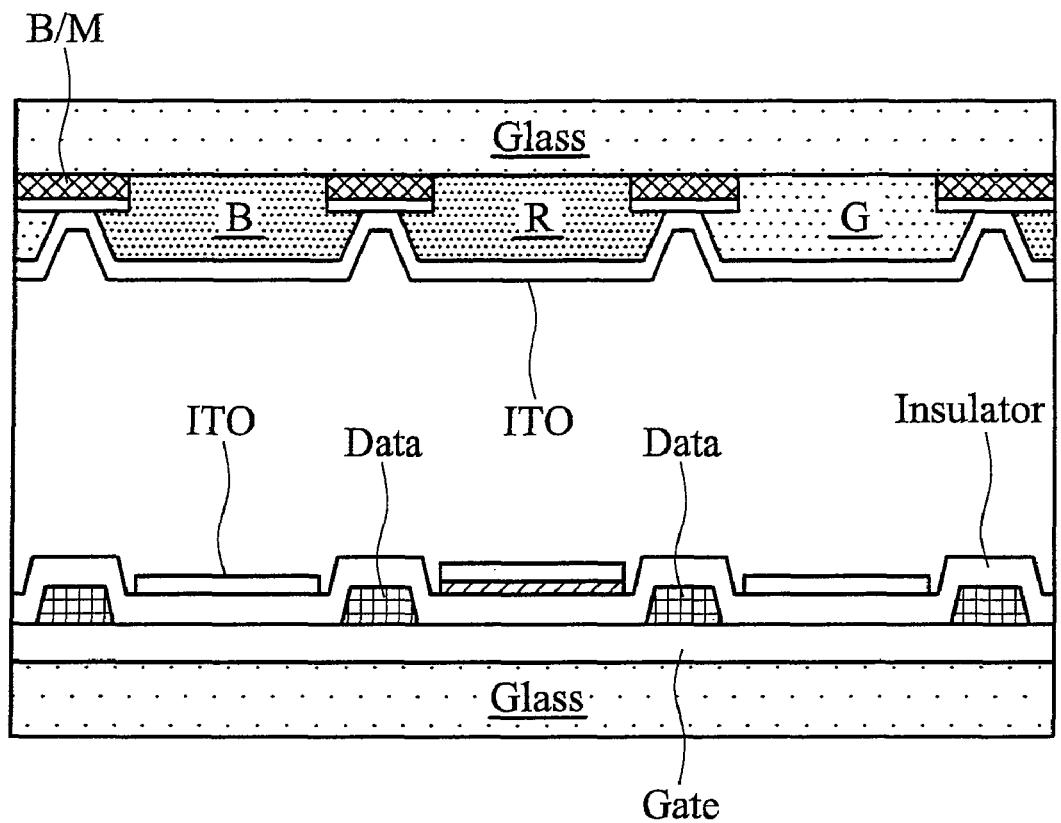
FIG. 19 is cross-sectional view of an exemplary embodiment of a liquid crystal display.

FIG. 13 shows an exemplary embodiment of a readout pixel circuit, wherein the photo element 300 is given as an example to be applied in a readout pixel. The readout pixel is disposed in a thin film transistor array substrate (or an array substrate). Generally, the thin film transistor array substrate comprises a plurality of gate lines and a plurality of data lines formed on it. The gate lines and the data lines define a plurality of general pixels and readout pixels. To simplify and clearly describe the readout pixel, FIG. 13 shows only one readout pixel defined by a gate line 420 and a data line 410. The description of a general pixel (a pixel without a built-in photo element) is omitted herein. The readout pixel comprises a liquid crystal capacitor $C_{LC}$, a storage capacitor $C_{ST}$, a pixel thin film transistor (TFT) 450, and a photo element 300. The pixel TFT 450 is arranged to be a switch element to control voltage required for a pixel electrode of a liquid crystal display. A drain and gate of the pixel TFT 450 are electrically coupled to the data line 410 and the gate line 420 respectively. The photo element 300 comprises a photo TFT 430 and a switch TFT 435 and is electrically coupled between a readout line 440 and a switch line 421. In some embodiments, the switch line 421 can be another gate line or a line for other functions. In the embodiment of FIG. 13, at least one of the switch TFT 435 and the photo TFT 430 is an asymmetric transistor. As described above, since the light sensitivity of the photo element of the embodiment is higher than that of the conventional photo element, a light current of the readout pixel can be detected and read out easily. Moreover, the switch TFT 435 is disposed directly under a black matrix of an upper substrate of the liquid crystal display, so that the switch TFT 435 can not be affected by environment brightness changes. FIG. 19 is cross-sectional view of an exemplary embodiment of a liquid crystal display. As shown in FIG. 19, the switch TFT 435 is disposed directly under a black matrix B/M of an upper substrate (the upper glass), thereby minimizing interference of environment light to the switch TFT 435.

Figure 14:
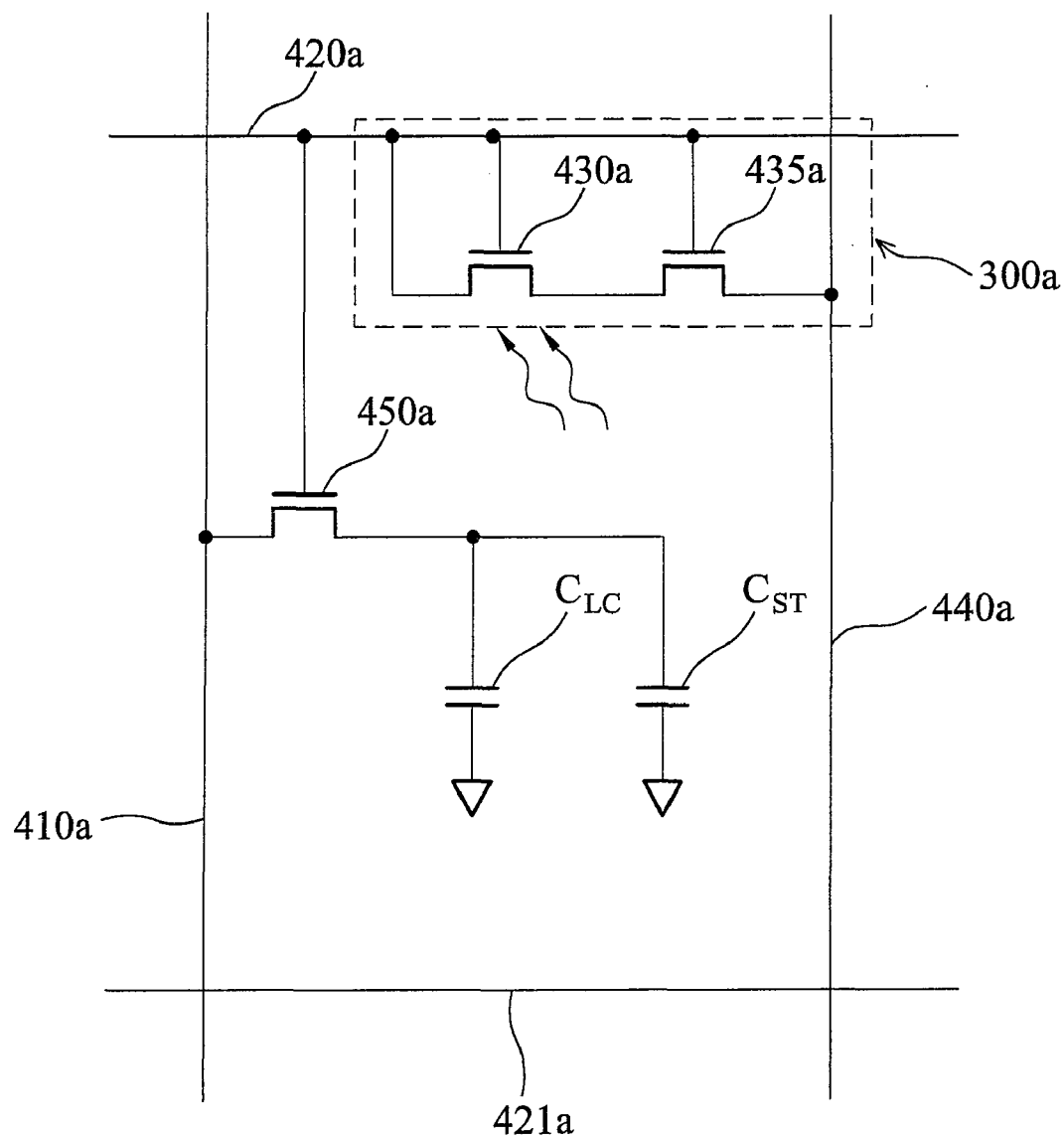
FIG. 14 shows another exemplary embodiment of a readout pixel circuit.

Similarly, FIG. 14 shows another exemplary embodiment of a readout pixel circuit. The difference between FIGS. 13 and 14 is the disposition of the photo elements 300 and 300a. The photo element 300a is electrically coupled between a gate line 420a and a readout line 440a. The photo element 300a comprises a photo TFT 430a and a switch TFT 435a. At least one of the switch TFT 435a and the photo TFT 430a is an asymmetric transistor. Moreover, a drain and a gate of the pixel TFT 450a are electrically coupled to a data line 410a and a gate line 420a respectively.

Figure 15:
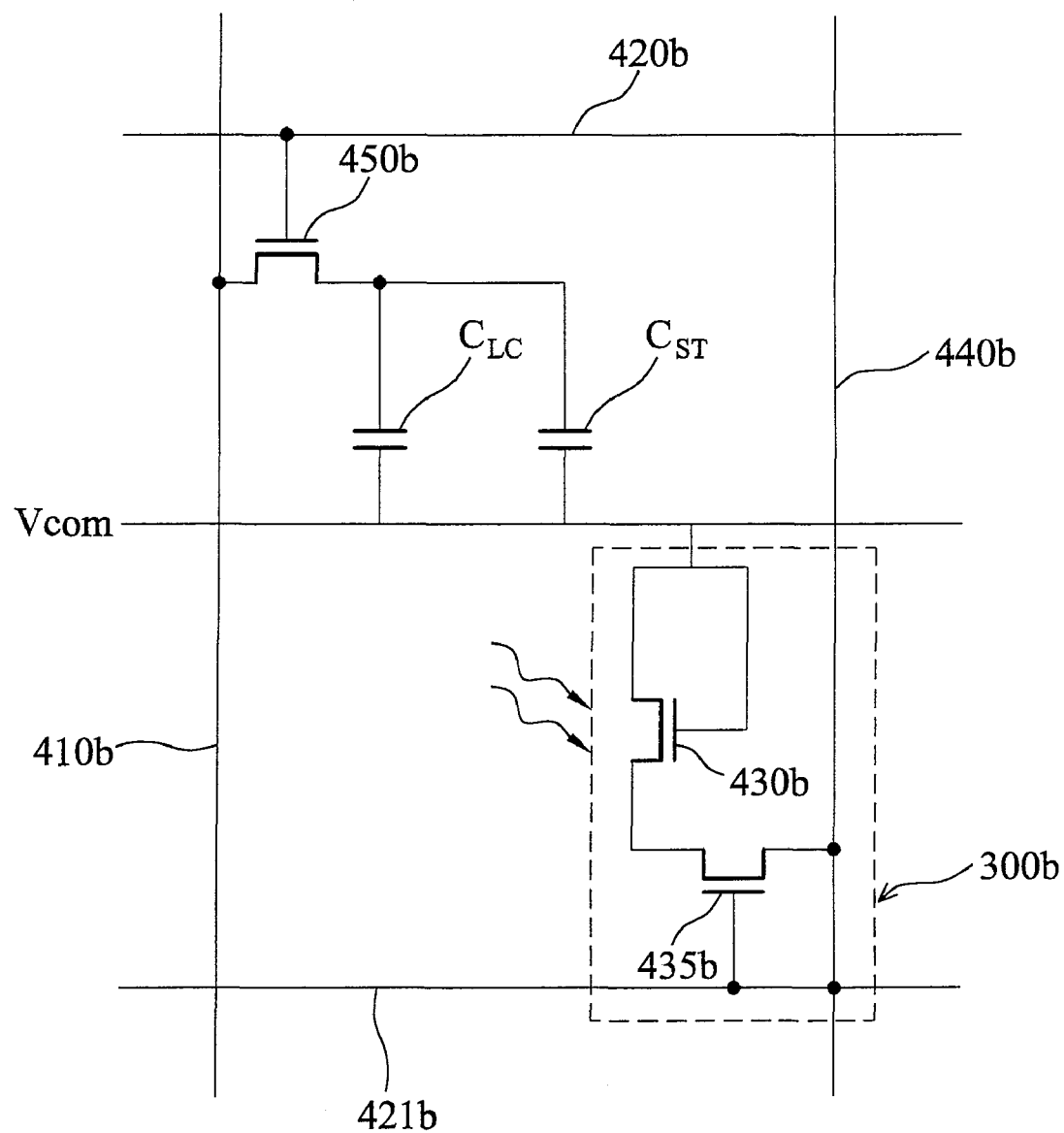
FIG. 15 shows another exemplary embodiment of a readout pixel circuit.

FIG. 15 shows another exemplary embodiment of a readout pixel circuit, wherein the photo element 200 of FIG. 2 is given as an example to be applied in a readout pixel. The photo element 300b comprises a photo TFT 430b and a switch TFT 435b. The photo TFT 430b is electrically coupled to a gate line 421b, a common voltage line Vcom (or a bias line), and a readout line 440b. A drain and a gate of a pixel TFT 450b are electrically coupled to the data line 410b and the gate 420b respectively. And in this embodiment, the potential of the common voltage line can be set higher than a potential of the readout line 440b. In some embodiments, the photo element 1000 as shown in FIG. 10 can be also integrated in an image displaying system, as the photo element 200, however, a detailed description is omitted.

Figure 16:
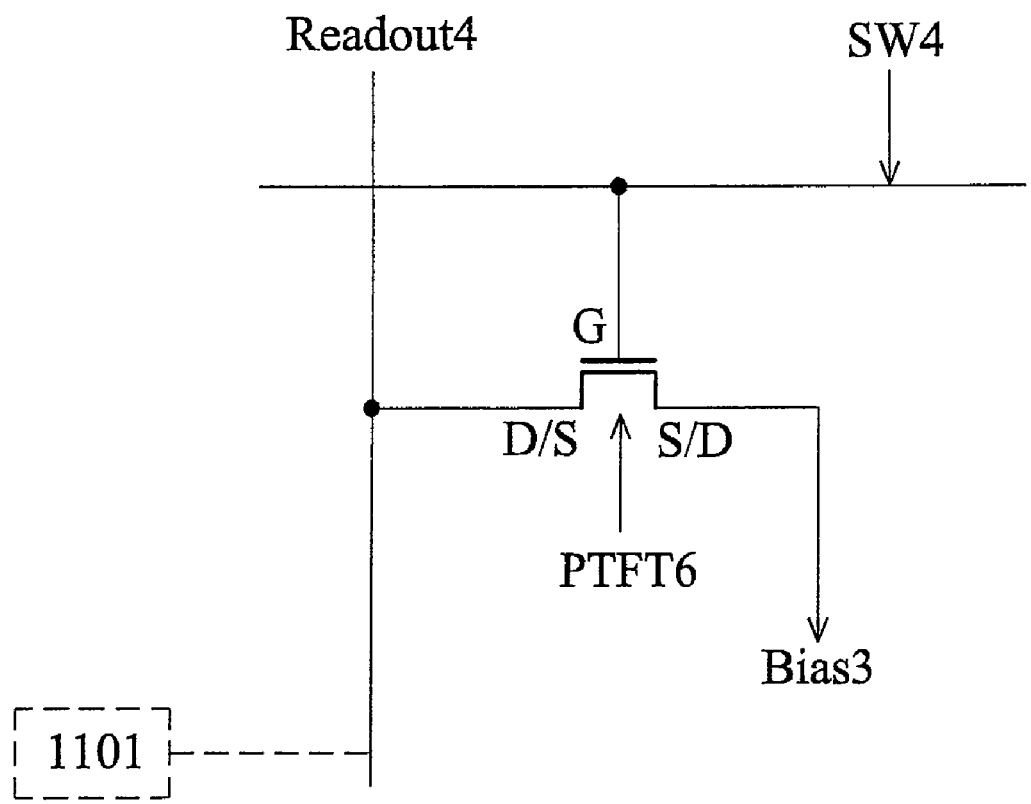
FIG. 16 shows another exemplary embodiment of a photo element.

FIG. 16 shows another exemplary embodiment of a photo element 1600. The difference between the photo element 1600 and the above photo elements is that the photo element 1600 does not comprise a switch transistor STFT6 and a photo transistor PTFT6 is an asymmetric transistor. The photo transistor PTFT6 is electrically coupled between a readout line Readout4 (a first line) and a bias line Biase3 (a third line). A gate of the photo transistor PTFT6 is electrically coupled to a switch line SW4 (a second line), and a drain and a source thereof are electrically coupled to a high potential and a low potential respectively. Moreover, the readout line Readout4 is electrically coupled to a signal detector 1101 so that a light current generated by the photo transistor PTFT6 can be provided to the signal detector 1101 through the readout line Readout4 for detecting and reading the degree of the received light.

Figure 17:
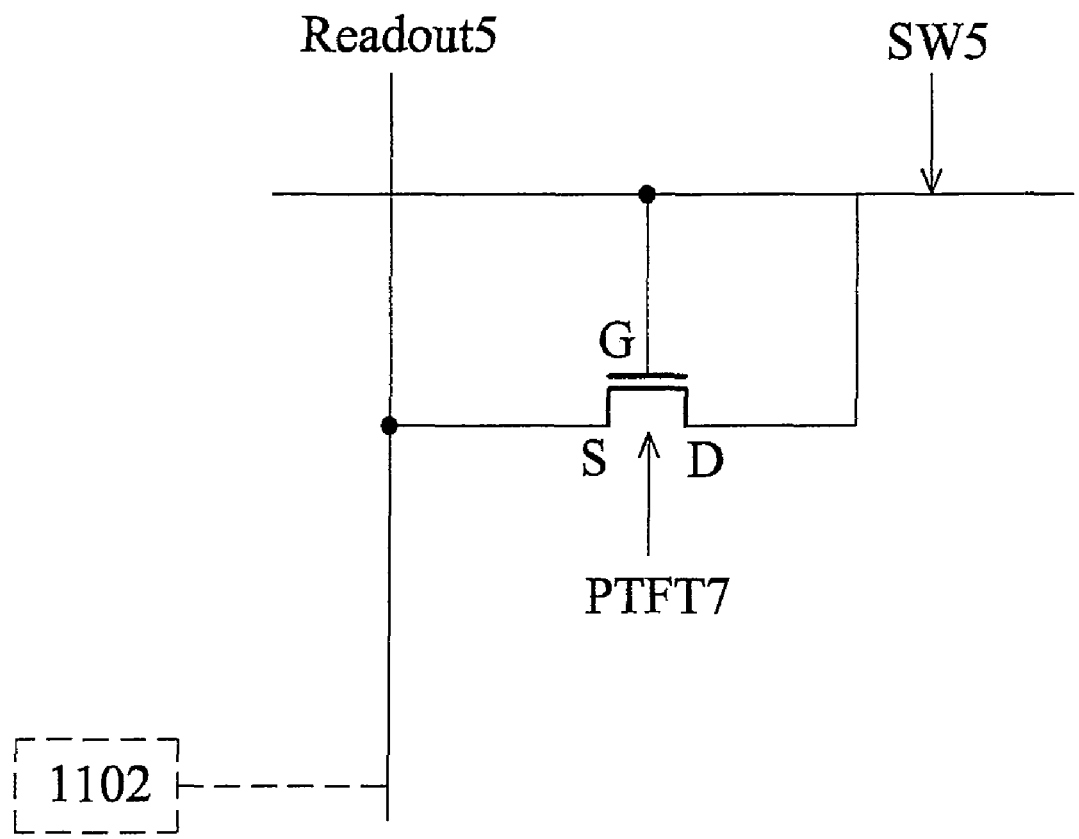
FIG. 17 shows another exemplary embodiment of a photo element.

FIG. 17 shows another exemplary embodiment of a photo element 1700. The photo element 1700 comprises a photo transistor PTFT7, and the photo transistor PTFT7 is an asymmetric transistor. A gate G and a drain D of the photo transistor PTFT7 are electrically coupled to a switch line SW5 (a second line), and source S thereof are electrically coupled to a readout line Readout5 (a first line). Moreover, the readout line Readout5 is electrically coupled to a signal detector 1102 so that a light current generated by the photo transistor PTFT7 can be provided to the signal detector 1102 through the readout line Readout5 for detecting and reading the degree of the received light.

Specially, if the photo transistor PTFT6 or PTFT7 has a large switch current ratio $I_{on}/I_{off}$, the photo transistor PTFT6 or PTFT7 can serve as a switch transistor and a photo transistor as described above at the same time. This is because when photo transistor PTFT6 or PTFT7 has a large switch current ratio $I_{on}/I_{off}$, the light current generated by the photo transistor PTFT6 or PTFT7 is much larger than the leakage current generated by the turned-off photo transistor PTFT6 or PTFT7. In other words, when the photo transistor PTFT6 or PTFT7 is applied in a display panel, the leakage current does not affect the light current generated by the photo transistor PTFT6 or PTFT7 significantly, which is one of the reasons why the photo element 1600 or 1700 does not need a switch transistor.

Figure 18:
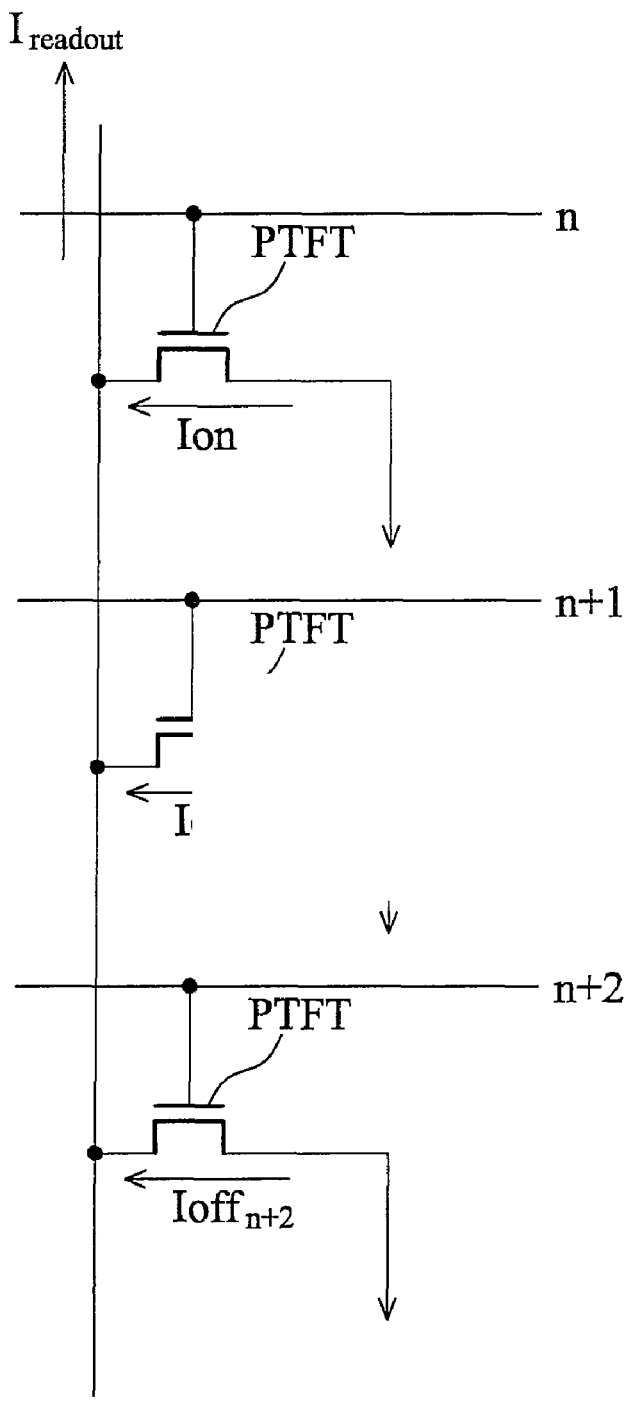
FIG. 18 shows an exemplary embodiment of a liquid crystal display panel in which a photo element is applied.

FIG. 18 shows an exemplary embodiment of a liquid crystal display panel in which the photo element of FIG. 16 is applied. For simplicity, only connections between a photo element, switch lines n, n+1, n+2 and a readout line are shown in each pixel, and the descriptions of other elements, such pixel transistors, is omitted. According to FIG. 18, when the n-th photo element is read, a current Ireadout on the readout line is the sum of currents flowing though the photo transistor PTFT (Ireadout=Ion+Ioff$_{(n+1)}$+Ioff$_{(n+2)}$+ . . . ). Thus, when each photo transistor has a large switch current ratio $I_{on}/I_{off}$, the photo transistor can serve as a switch transistor and a photo transistor at the same time. The value of current Ion is much larger than the values of leakage current Ioff$_{(n+1)}$, I$_{(n+2)}$ . . . , so that a signal detector (not shown) electrically coupled to the readout line can still detect the position of the touched pixel. In this embodiment, the photo transistor PTFT has a first electrode, a second electrode, and a gate, and the first electrode is electrically coupled to the readout line, the gate is electrically coupled to the switch line (such as n, n+1, n+2), and the photo transistor PTFT is preferably an asymmetric transistor, which a length of the first electrode is shorter than a length of the second electrode, and a potential of the second electrode is higher than a potential of the first electrode. Besides, in other embodiment, the second electrode of the photo transistor PTFT can be electrically coupled to a conductive line (a bias line or a common voltage line), and a potential of the conductive line is higher than a potential of the readout line. Similarly, in another embodiment, the second electrode of the photo transistor PTFT can also be electrically coupled to the switch line (such as n, n+1, n+2) and a potential of the switch line is higher than a potential of the readout line.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A photo element comprising:
a first line;
a second line;
a switch transistor having a first electrode, a second electrode, and a first gate, wherein one of the first electrode and the second electrode is electrically coupled to the first line, and the first gate is electrically coupled to the second line; and
a photo transistor, electrically coupled to the switch transistor, for detecting light and having a third electrode, a fourth electrode, and a second gate, wherein at least one of the switch transistor and the photo transistor is an asymmetric transistor.

2. The photo element as claimed in claim 1, wherein a length of the second electrode is longer than a length of the first electrode, and a potential of the first electrode is higher than a potential of the second electrode.

3. The photo element as claimed in claim 2, wherein a length of the fourth electrode is shorter than a length of the third electrode, and a potential of the third electrode is higher than a potential of the fourth electrode.

4. The photo element as claimed in claim 1 further comprising a signal detector electrically coupled to the first line.

5. The photo element as claimed in claim 1, wherein a length of the fourth electrode is shorter than a length of the third electrode, and a potential of the third electrode is higher than a potential of the fourth electrode.

6. The photo element as claimed in claim 1, wherein the first electrode and the second electrode are electrically coupled to the fourth electrode and the first line respectively.

7. The photo element as claimed in claim 6 further comprising a third line, wherein both of the third electrode and the second gate are electrically coupled to the third line.

8. The photo element as claimed in claim 6, wherein both of the third electrode and the second gate are electrically coupled to the second line.

9. The photo element as claimed in claim 8, wherein the switch transistor is a symmetric transistor and the photo transistor is an asymmetric transistor, and a channel length of the photo transistor is shorter than a channel length of the switch transistor.

10. The photo element as claimed in claim 8, wherein the switch transistor is a symmetric transistor and the photo transistor is an asymmetric transistor, and a channel length of the photo transistor is equal to a channel length of the switch transistor.

11. The photo element as claimed in claim 6 further comprising a third line, wherein the first electrode is electrically coupled to the first line, both the fourth electrode and the second gate are electrically coupled to the second electrode, and the third electrode is coupled to the third line.

12. The photo element as claimed in claim 1, wherein both of the switch transistor and the photo transistor are asymmetric transistors.

13. The photo element as claimed in claim 1, wherein the asymmetric transistor is implemented by a U-shaped, C-shaped, or semicircle-shaped transistor.

14. The photo element as claimed in claim 1, wherein the photo element is applied in a display panel.

15. The photo element as claimed in claim 14, wherein the display panel is an input panel.

16. An input device comprising:
a readout line;
a switch line;
a photo transistor for detecting light and having a first electrode, a second electrode, and a gate, wherein the first electrode is electrically coupled to the readout line, the gate is electrically coupled to the switch line, and the photo transistor is an asymmetric transistor; and
a signal detector, electrically coupled to the readout line, for detecting a light current generated by the photo transistor.

17. The input device as claimed in claim 16, wherein a length of the first electrode is shorter than a length of the second electrode, and a potential of the second electrode is higher than a potential of the first electrode.

18. The input device as claimed in claim 17 further comprising a third line electrically coupled to the second electrode, wherein a potential of the third line is higher than a potential of the readout line.

19. The input device as claimed in claim 17, wherein the second electrode is electrically coupled to the switch line and a potential of the switch line is higher than a potential of the readout line.

20. An image display comprising:
a first substrate; and
a pixel disposed on the first substrate, wherein the pixel comprises:
a pixel electrode;
a first line;
a second line;
a pixel transistor electrically coupled to the pixel electrode;
a switch transistor having a first electrode, a second electrode, and a first gate, wherein one of the first electrode and the second electrode is electrically coupled to the first line, and the first gate is electrically coupled to the second line; and
a photo transistor electrically coupled to the switch transistor and having a third electrode, a fourth electrode, and a second gate, wherein at least one of the switch transistor and the photo transistor is an asymmetric transistor.

21. The image display as claimed in claim 20, wherein the second line is a gate line of the image display.

22. The image display as claimed in claim 20, wherein a length of the second electrode is longer than a length of the first electrode, and a potential of the first electrode is higher than a potential of the second electrode.

23. The image display as claimed in claim 22, wherein a length of the fourth electrode is shorter than a length of the third electrode, and a potential of the third electrode is higher than a potential of the fourth electrode.

24. The image display as claimed in claim 20 further comprising a signal detector electrically coupled to the first line.

25. The image display as claimed in claim 20, wherein a length of the fourth electrode is shorter than a length of the third electrode, and a potential of the third electrode is higher than a potential of the fourth electrode.

26. The image display as claimed in claim 25, wherein the first electrode and the second electrode are electrically coupled to the fourth electrode and the first line respectively.

27. The image display as claimed in claim 26 further comprising a third line, wherein both of the third electrode and the second gate are electrically coupled to the third line, and a potential of the third line is higher than a potential of the first line.

28. The image display as claimed in claim 27, wherein the third line is a common voltage line.

29. The image display as claimed in claim 26, wherein both of the third electrode and the second gate are electrically coupled to the second line.

30. The image display as claimed in claim 26 further comprising a third line, wherein the third electrode is electrically coupled to the third line.

31. The image display as claimed in claim 20, wherein a channel length of the photo transistor is shorter than a channel length of the switch transistor.

32. The image display as claimed in claim 20, wherein a channel length of the photo transistor is equal to a channel length of the switch transistor.

33. The image display as claimed in claim 20 further comprising a second substrate having a black matrix disposed in opposition to the first substrate, wherein the switch transistor is disposed directly under the black matrix.

* * * * *